US012693488B2

(12) United States Patent
Yasutake

(10) Patent No.: US 12,693,488 B2
(45) Date of Patent: Jul. 28, 2026

(54) LENS BARREL

(71) Applicant: CANON KABUSHIKI KAISHA, Tokyo (JP)

(72) Inventor: Yuta Yasutake, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 18/666,164

(22) Filed: May 16, 2024

(65) Prior Publication Data

US 2025/0004239 A1      Jan. 2, 2025

(30) Foreign Application Priority Data

Jun. 29, 2023    (JP) ................................. 2023-107105

(51) Int. Cl.
G02B 7/02              (2021.01)
(52) U.S. Cl.
CPC ............. G02B 7/021 (2013.01); G02B 7/023 (2013.01); G02B 7/026 (2013.01)
(58) Field of Classification Search
None
See application file for complete search history.

(56) References Cited

U.S. PATENT DOCUMENTS

2019/0317296 A1 * 10/2019 Oyama .................. H04N 23/55

FOREIGN PATENT DOCUMENTS

| | | | | |
|---|---|---|---|---|
| JP | 2776160 | B2 | * | 7/1998 |
| JP | 2010044166 | A | * | 2/2010 |
| JP | 2014052429 | A | * | 3/2014 |
| JP | 6305051 | B2 | | 4/2018 |

* cited by examiner

*Primary Examiner* — Shan Liu
(74) *Attorney, Agent, or Firm* — Cowan, Liebowitz & Latman, P.C.

(57)              ABSTRACT

A lens barrel is provided in which two fit portions of a first holder for holding a first lens and two fit portions of a second holder for holding a second lens are alternated. The first holder includes a first engagement portion and a first contact portion. The second holder includes a second engagement portion and a second contact portion. The first engagement portion and the second engagement portion are engaged with each other with a gap formed in a direction orthogonal to the optical axis direction. The first contact portion and the second contact portion contact each other in the optical axis direction so that the first lens and the second lens do not contact each other while the first engagement portion and the second engagement portion of the second holder are engaged with each other.

9 Claims, 13 Drawing Sheets

LENS BARREL

BACKGROUND

Technical Field

One of the aspects of the embodiments relates to a lens barrel in which fit portions of sleeves of two lens moving frames are alternately disposed relative to one guide bar.

Description of Related Art

In a general lens barrel mounted on a surveillance camera, etc., tilt relative to an optical axis direction of a lens moving frame, which is movably supported in the optical axis direction by a guide bar, affects optical performance. Japanese Patent No. 2776160 discloses a structure that fit two fit portions provided on respective sleeves of two lens moving frames with the same guide bar such that they sandwich one of the fit portions of the counterpart sleeves, in order to reduce the tilts of the lens moving frames.

In addition, the lens barrel is demanded to prevent adjacent lenses from contacting each other (colliding with each other) and getting damaged, in a case where the lens moving frame is bent or moved in the optical axis direction upon impact. Japanese Patent No. 6305051 discloses a structure that prevents two optical members from contacting each other in order to improve the impact resistance of a lens barrel, in a case where the two optical members approach each other upon impact and a contact member that moves integrally with one optical member comes into contact with the other optical member.

While the two lens moving frames overlap each other during assembling, the structure disclosed in Japanese Patent No. 2776160 is to insert the same guide bar into the fit portion provided on each sleeve. In a case where the lenses held by the two lens moving frames are close to each other and the two lens moving frames overlap each other while their relative positions are significantly shifted in the structure of Japanese Patent No. 2776160, the adjacent lenses may contact each other and get damaged.

Moreover, since the optical member and the contact member contact each other in the structure of Japanese Patent No. 6305051, the optical member may get damaged depending on the material of the contact member.

SUMMARY

A lens barrel according to one aspect of the disclosure includes a first holder configured to hold a first lens, a second holder configured to hold a second lens disposed adjacent to the first lens in an optical axis direction, a first guide bar configured to support the first holder and the second holder movably in the optical axis direction, and a second guide bar configured to restrain the first holder and the second holder from rotating around the first guide bar. The first holder includes two first fit portions in which the first guide bar is fit at positions separated in the optical axis direction, and a first groove engaged with the second guide bar. The second holder includes two second fit portions in which the first guide bar is fit at positions separated in the optical axis direction, and a second groove engaged with the second guide bar. One of the first fit portions is located between the second fit portions in the optical axis direction. One of the second fit portions is located between the first fit portions in the optical axis direction. The first holder includes a first engagement portion and a first contact portion. The second holder includes a second engagement portion and a second contact portion. The first engagement portion and the second engagement portion are engaged with each other with a gap formed in a direction orthogonal to the optical axis direction. The first contact portion and the second contact portion contact each other in the optical axis direction so that the first lens and the second lens do not contact each other while the first engagement portion and the second engagement portion of the second holder are engaged with each other.

Further features of various embodiments of the disclosure will become apparent from the following description of embodiments with reference to the attached drawings.

DESCRIPTION OF THE EMBODIMENTS

Figure 1A:
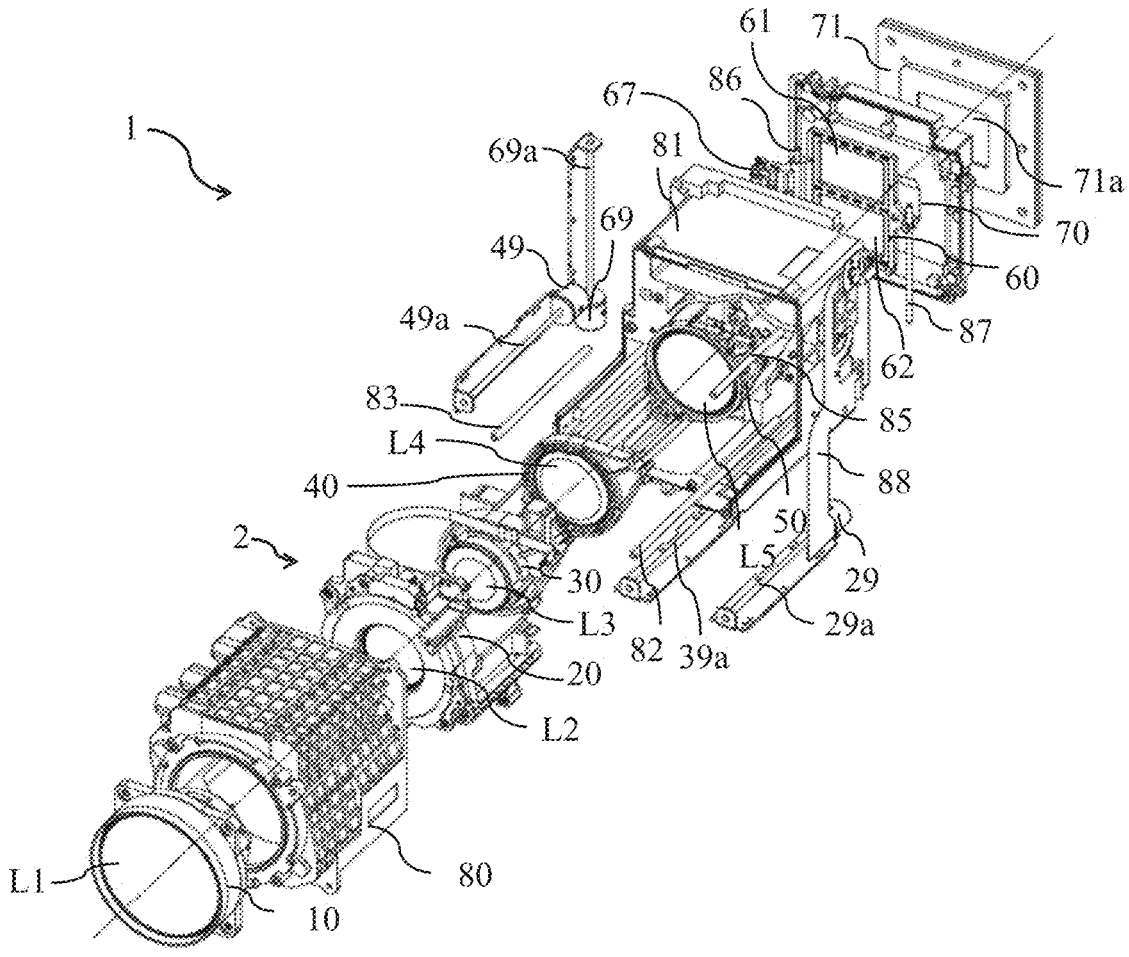
FIGS. 1A and 1B are exploded perspective views of a lens barrel according to a first embodiment.

Referring now to the accompanying drawings, a detailed description will be given of embodiments according to the disclosure. Corresponding elements in respective figures will be designated by the same reference numerals, and a duplicate description thereof will be omitted.

In each embodiment, an object side in the optical axis direction will be defined as a front side, and an imaging surface side (image side) will be defined as a rear side.

First Embodiment

Figure 1B:
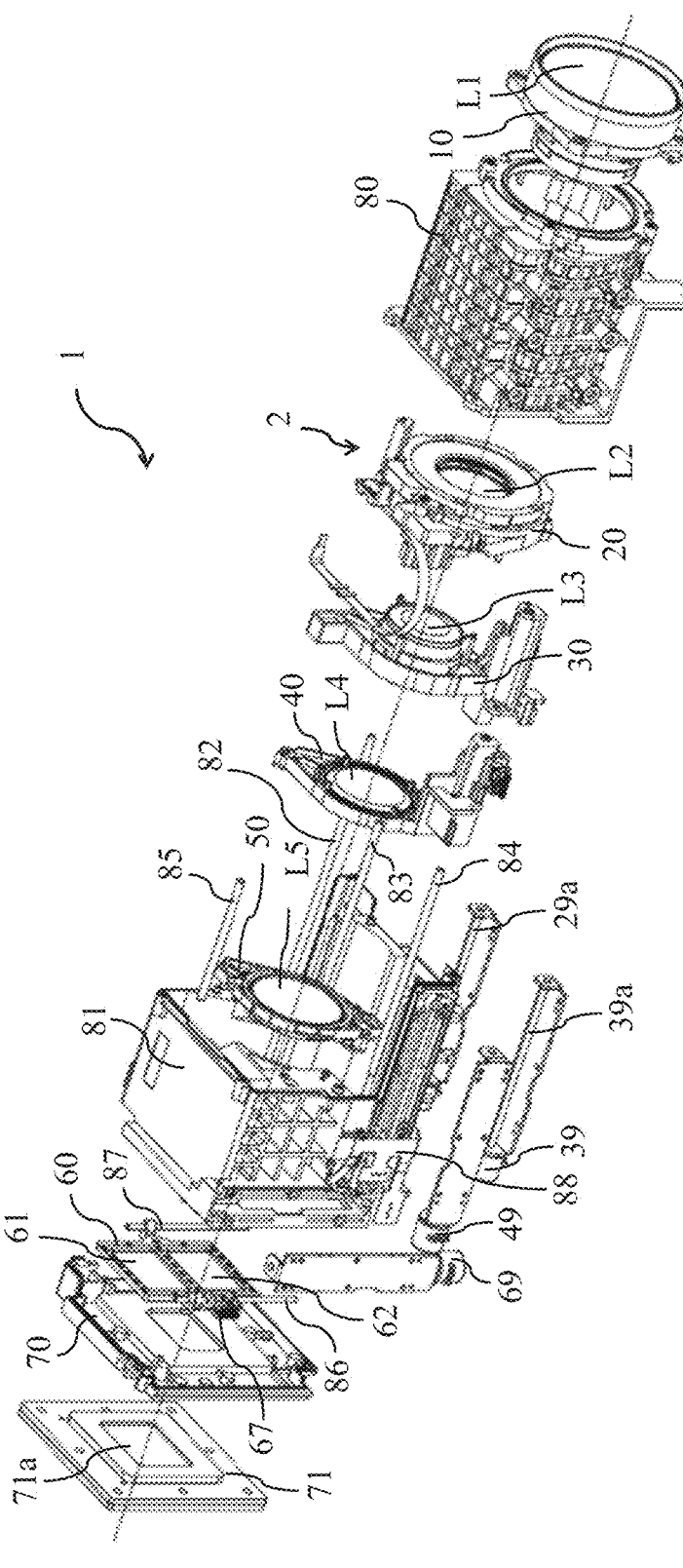

FIGS. 1A and 1B are exploded perspective views of a lens barrel 1. The lens barrel 1 includes a first lens unit L1, a second lens unit L2, a third lens unit L3, a fourth lens unit L4, and a fifth lens unit L5. The first lens unit L1 and the fifth lens unit L5 are fixed lenses, and the second lens unit L2, the third lens unit L3, and the fourth lens unit L4 are movable lenses. During zooming, the second lens L2, the third lens unit L3, and the fourth lens unit L4 are moved in an optical axis direction, and during focusing, the fourth lens unit L4 is moved in the optical axis direction. Each of the first lens unit L1, the second lens unit L2, the third lens unit L3, the fourth lens unit L4, and the fifth lens unit L5 includes one or more lenses.

The first lens unit L1 is held by a (first lens unit) fixing frame 10. The fixing frame 10 is fixed to a front fixed frame 80 with unillustrated screws.

The second lens unit L2 is held by a (second lens unit) moving frame 20. The moving frame 20 is supported movably in the optical axis direction by a guide bar 82, and restrained from rotating about the guide bar 82 by a guide bar 83.

The third lens unit L3 is held by a (third lens unit) moving frame 30. The moving frame 30 is supported movably in the optical axis direction by a common guide bar (first guide bar) 84, and restrained from rotating about the common guide bar 84 by a common guide bar (second guide bar) 85.

The fourth lens unit L4 is held by a (fourth lens unit) moving frame 40. The moving frame 40 is supported movably in the optical axis direction by the common guide bar 84, and restrained from rotating about the common guide bar 84 by the common guide bar 85.

The fifth lens unit L5 is held by a (fifth lens unit) fixing frame 50. The fixing frame 50 is fixed to a rear fixed frame 81 with unillustrated screws.

In this embodiment, one of the moving frame 30 and the moving frame 40 functions as a first holder configured to hold the first lens, and the other of the moving frame 30 and the moving frame 40 functions as a second holder configured to hold the second lens disposed adjacent to the first lens in the optical axis direction. In this embodiment, the moving frame 30 functions as the first holder and the moving frame 40 functions as the second holder, but this embodiment is not limited to this example.

The front fixed frame 80 is coupled to the rear fixed frame 81 with unillustrated screws. The guide bars 82 and 83 and the common guide bars 84 and 85 are held and fixed between the front fixed frame 80 and the rear fixed frame 81.

An infrared cut filter 61 and a dummy glass 62 are held by an optical filter holding frame 60. The optical filter holding frame 60 is supported movably in a direction orthogonal to the optical axis by a guide bar 86, and restrained from rotating about the guide bar 86 by a guide bar 87. Thereby, the infrared cut filter 61 and the dummy glass 62 can be switched as an optical filter on the optical path. In a case where the infrared cut filter 61 is inserted into the optical path and the dummy glass 62 is retracted from the optical path, visible light can be collected while infrared light is cut. This state is an imaging mode called a day mode, and enables an object to be imaged during the daytime. In a case where the infrared cut filter 61 is retracted from the optical path and the dummy glass 62 is inserted into the optical path, infrared light can be collected in addition to visible light. This state is an imaging mode called a night mode, and enables an object to be imaged at night.

An image sensor unit 71 includes an image sensor 71a and is fixed to an image sensor unit holding frame 70 with unillustrated screws. The image sensor unit holding frame 70 is coupled to the rear fixed frame 81 with unillustrated screws. The guide bars 86 and 87 are sandwiched and fixed between the image sensor unit holding frame 70 and the rear fixed frame 81.

A lens flexible printed circuit (FPC) 88, a stepping motor 29, a stepping motor 39, a stepping motor 49, and a stepping motor 69 are fixed onto the rear fixed frame 81. The lens FPC 88 is connected to the stepping motors 29, 39, 49, and 69, and activates them when energized. The lens FPC 88 is also connected to an aperture stop FPC 24b of an aperture stop (diaphragm) unit 24, and activates the aperture stop unit 24 when energized. An unillustrated photo-interrupter is mounted on the lens FPC 88. The stepping motors 29, 39, 49, and 69 control the positions of the moving frames 20, 30, and 40, and the optical filter holding frame 60, respectively, based on the output of the unillustrated photo-interrupter.

Figure 2:
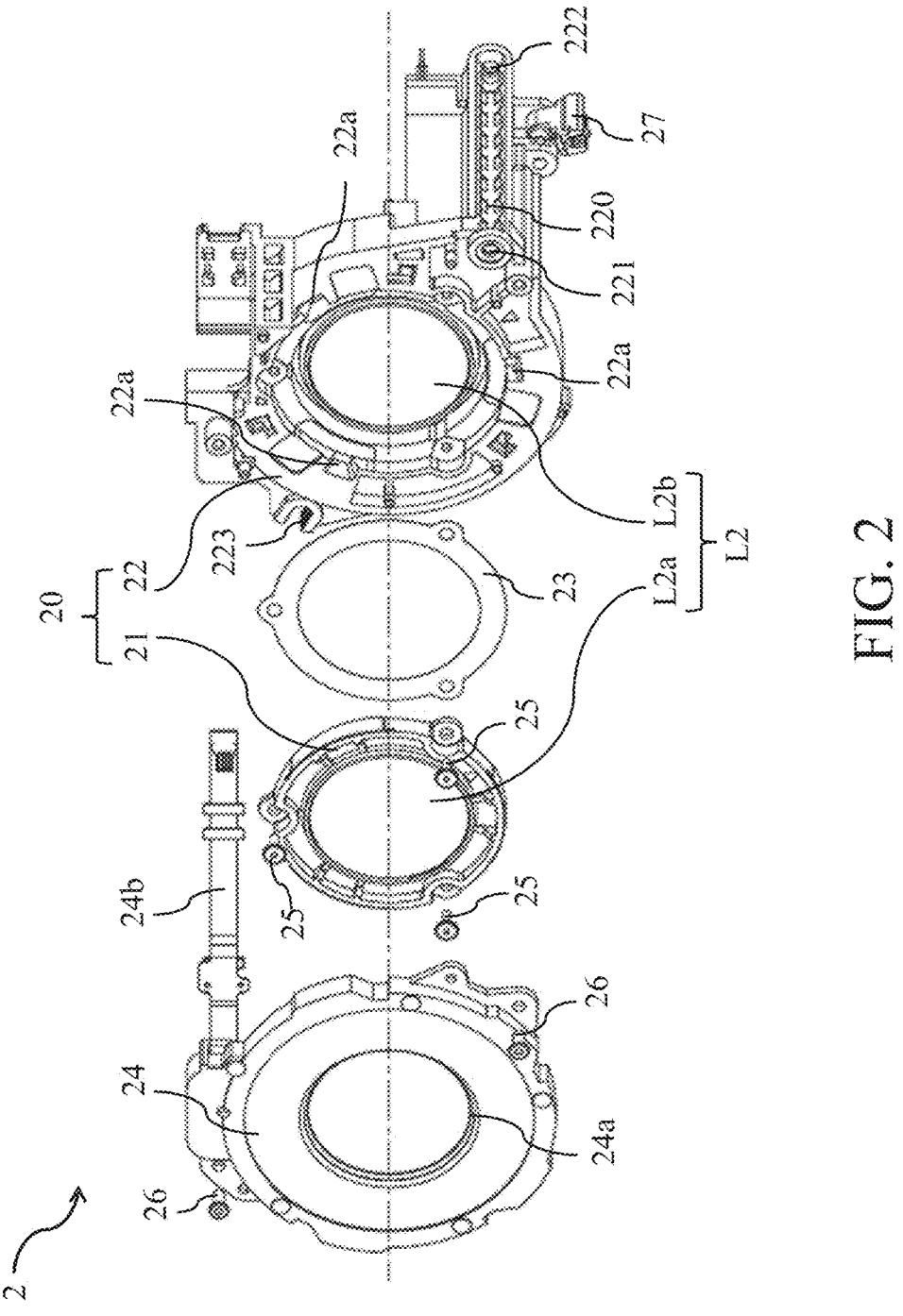
FIG. 2 is an exploded perspective view of a second unit according to the first embodiment.

FIG. 2 is an exploded perspective view of a second unit 2. The second unit 2 includes the second lens unit L2, the moving frame 20, a sheet member 23, the aperture stop unit 24, and a rack 27. The second lens unit L2 includes a second adjusting lens L2a and a second reference lens L2b. The moving frame 20 includes a second adjusting lens holding frame 21 and a second reference lens holding frame 22.

The second adjusting lens L2a is held by the second adjusting lens holding frame 21, and it is necessary to perform distance (or interval) adjustment and eccentricity adjustment for the second reference lens L2b. The second reference lens L2b is held by the second reference lens holding frame 22, and serves as a reference for the distance adjustment and eccentricity adjustment of the second adjusting lens L2a.

The distance adjustment is performed by inserting the sheet member 23 between the second adjusting lens holding frame 21 and the second reference lens holding frame 22. The sheet member 23 is selected from a plurality of sheet members each having a different thickness depending on a distance between the second adjusting lens L2a and the second reference lens L2b. The sheet member 23 is formed, for example, by punching a polyester film or etching stainless steel. In a case where it is difficult to directly measure a distance between the second adjusting lens L2a and the second reference lens L2b, the sheet member 23 may be selected using another method. For example, the second reference lens holding frame 22 may be attached to the adjustment tool, the second adjusting lens holding frame 21 may be provisionally fixed to the second reference lens holding frame 22 by the temporary positioning mechanism, optical performance such as aberration and contrast may be measured, and the sheet member 23 may be selected.

The eccentricity adjustment (decentering) is performed by adjusting the position of the second adjusting lens holding frame 21 relative to the second reference lens holding frame 22 using an adjusting pin included in the adjustment tool while the sheet member 23 is inserted between the second adjusting lens holding frame 21 and the second reference lens holding frame 22 within a plane orthogonal to the optical axis. For example, the adjustment tool has three adjusting pins, which are arranged at approximately regular intervals along the circumferential direction around the optical axis as a center, and contact the outer circumferential surface of the second adjusting lens holding frame 21. There is a clearance in a radial direction between the outer circumference surface of the second adjusting lens holding frame 21 and the inner circumference surface of the second reference lens holding frame 22. The position of the second adjusting lens holding frame 21 can be changed within the second reference lens holding frame 22 by this adjustment clearance. Changing the position in the radial direction of the adjusting pin can adjust the position of the second adjusting lens holding frame 21 within a plane orthogonal to the optical axis. The eccentricity adjustment is performed by searching for the best position of the second adjusting lens holding frame 21 while optical performance such as aberration and contrast is measured. The second adjusting lens holding frame 21 is fixed to the second reference lens holding frame 22 with an adhesive at the best position. The adhesive is, for example, an ultraviolet curing adhesive, which is injected into three adhesive grooves 22a in the second reference lens holding frame 22, adheres to the outer circumferential surface of the second adjusting lens holding frame 21, and is cured by ultraviolet light irradiation. In this embodiment, the second adjusting lens holding frame 21 is fixed to the second reference lens holding frame 22 with an adhesive and then fixed with three screws 25.

The second reference lens holding frame 22 includes a sleeve 220 and a groove 223. The sleeve 220 includes a first (second-lens-unit) fit portion 221 and a second (second-lens-unit) fit portion 222. The first fit portion 221 is located at the front end (end portion on the front side) of the sleeve 220, and the second fit portion 222 is located at the rear end (end portion on the rear side) of the sleeve 220. The guide bar 82 is inserted through the first fit portion 221 and the second fit portion 222. That is, the first fit portion 221 and the second fit portion 222 have circular holes fit with the guide bar 82. Thereby, the second reference lens holding frame 22 is supported movably in the optical axis direction. In this embodiment, the diameter of the hole formed in the first fit portion 221 is smaller than the diameter of the hole formed in the second fit portion 222. The guide bar 83 is inserted into the groove 223. Thereby, rotation of the second reference lens holding frame 22 around the guide bar 82 is restricted.

The rack 27 is fixed to the second reference lens holding frame 22 while the rack 27 is biased in the optical axis direction and in the direction orthogonal to the optical axis by an unillustrated biasing spring. A torsion spring can be used as the unillustrated biasing spring. The rack 27 is engaged with a threaded portion 29a of the stepping motor 29. Therefore, the driving force of the stepping motor 29 is transmitted to the rack 27 via the threaded portion 29a, and the second reference lens holding frame 22 moves in the optical axis direction. Thereby, the moving frame 20 including the second reference lens holding frame 22 is movable in the optical axis direction between a first position closest to the image sensor 71a and a second position farthest from the image sensor 71a.

The aperture stop unit 24 is electrically connected to the aperture stop FPC 24b for inputting current from the outside. The aperture stop FPC 24b is pulled out from the inside of the lens barrel 1 to the outside of the rear fixed frame 81, and is connected to the lens FPC 88 that is connected to an external power supply. The aperture stop unit 24 can freely change the size of the aperture diameter of the aperture 24a formed by unillustrated aperture blades by changing the input current from the outside, and adjust an incident light amount. The aperture stop unit 24 is fixed to the second reference lens holding frame 22 with two screws 26. The aperture stop FPC 24b is gradually bent as the moving frame

20 including the second reference lens holding frame 22 moves from the second position farthest from the image sensor 71a to the first position closest to the image sensor 71a.

Figure 3A:
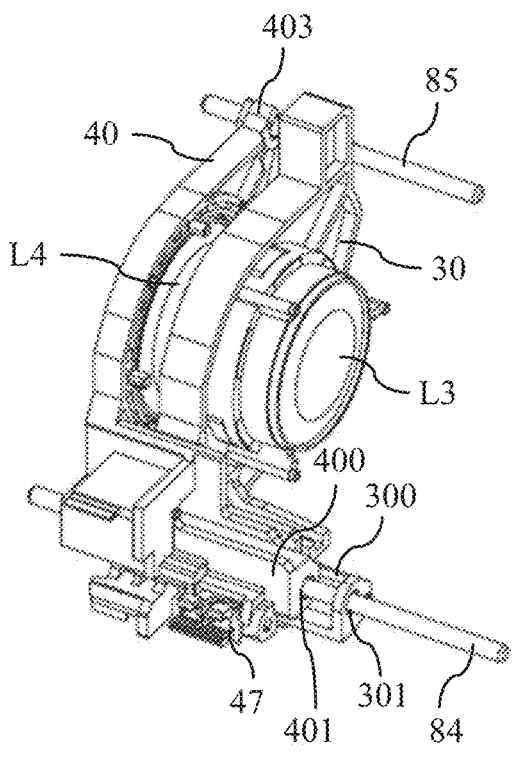
FIGS. 3A and 3B are perspective views illustrating a relationship between a third lens unit moving frame and a fourth lens unit moving frame according to the first embodiment.
Figure 3B:
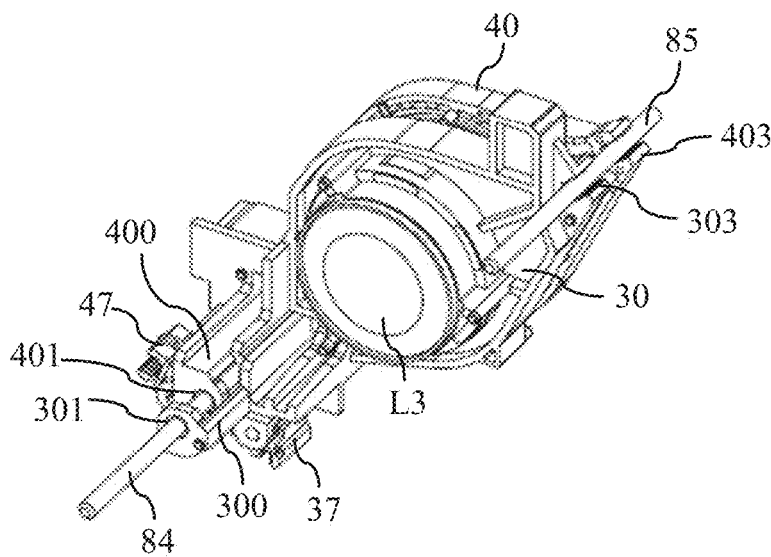
Figure 4:
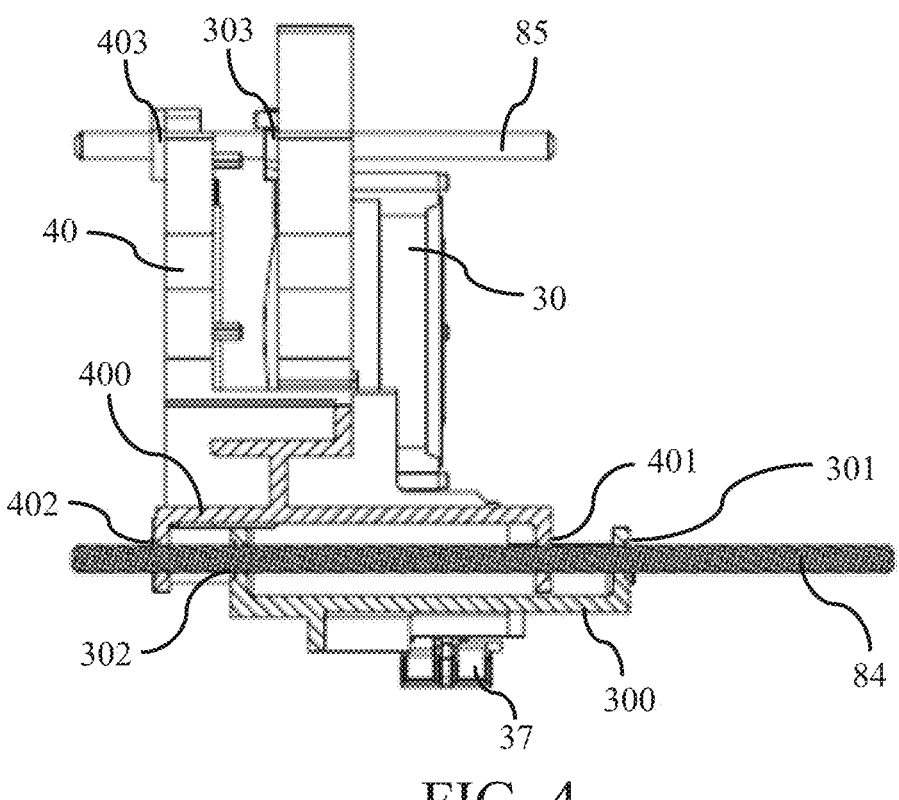
FIG. 4 is a sectional view of a common guide bar to a sleeve of the third lens unit moving frame and a sleeve of the fourth lens unit moving frame according to the first embodiment.

FIGS. 3A and 3B are perspective views illustrating a relationship between the moving frames 30 and 40. FIG. 4 is a sectional view along the common guide bar 84 of the sleeve 300 of the moving frame 30 and the sleeve 400 of the moving frame 40.

The moving frame 30 includes a sleeve 300 and a groove 303. The sleeve 300 has an approximate C-shape when viewed from a direction orthogonal to the optical axis, and includes two (three-lens-unit) fit portions (first fit portions) that are engaged with the common guide bar 84 at positions spaced in the optical axis direction. The two fit portions include a first (third-lens-unit) fit portion 301 and a second (third-lens-unit) fit portion 302. The first fit portion 301 is located at the front end (end portion on the front side) of the sleeve 300, and the second fit portion 302 is located at the rear end (end portion on the rear side) of the sleeve 300. The common guide bar 84 is inserted through the first fit portion 301 and the second fit portion 302. That is, the first fit portion 301 and the second fit portion 302 have circular holes that fit with the common guide bar 84. Thereby, the moving frame 30 is supported movably in the optical axis direction. In this embodiment, the diameter of the hole formed in the first fit portion 301 is larger than the diameter of the hole formed in the second fit portion 302. The common guide bar 85 is inserted into the groove 303. Thereby, the moving frame 30 around the common guide bar 84 is restrained from rotating.

The rack 37 is fixed onto the moving frame 30 while the rack 37 is biased in the optical axis direction and in the direction orthogonal to the optical axis by an unillustrated biasing spring. A torsion spring can be used as the unillustrated biasing spring. Further, the rack 37 is engaged with a threaded portion 39a of the stepping motor 39. Therefore, the driving force of the stepping motor 39 is transmitted to the rack 37 via the threaded portion 39a, and the moving frame 30 can move in the optical axis direction. Thereby, the moving frame 30 is movable in the optical axis direction between the first position closest to the image sensor 71a and the second position furthest from the image sensor 71a.

The moving frame 40 includes a sleeve 400 and a groove 403. The sleeve 400 has an approximate L-shape when viewed from a direction orthogonal to the optical axis, and includes two (fourth-lens-unit) fit portions (second fit portions) that are engaged with the common guide bar 84 at positions spaced in the optical axis direction. The two fit portions include a first (fourth-lens-unit) fit portion 401 and a second (fourth-lens-unit) fit portion 402. The first fit portion 401 is located at the front end (front end) of the sleeve 400, and the second fit portion 402 is located at the rear end (rear end) of the sleeve 400. The common guide bar 84 is inserted through the first fit portion 401 and the second fit portion 402. That is, the first fit portion 401 and the second fit portion 402 have circular holes that fit with the common guide bar 84. Thereby, the moving frame 40 is supported movably in the optical axis direction. In this embodiment, the diameter of the hole formed in the first fit portion 401 is larger than the diameter of the hole formed in the second fit portion 402. The common guide bar 85 is inserted into the groove 403. Thereby, the moving frame 40 around the common guide bar 84 is restrained from rotating.

The rack 47 is fixed onto the moving frame 40 while being biased in the optical axis direction and in the direction orthogonal to the optical axis by a biasing spring (not illustrated). A torsion spring can be used as the biasing spring (not illustrated). Further, the rack 47 engages with a threaded portion 49a of the stepping motor 49. Therefore, the driving force of the stepping motor 49 is transmitted to the rack 47 via the threaded portion 49a, and the moving frame 40 moves in the optical axis direction. Thereby, the moving frame 40 is movable in the optical axis direction between the first position closest to the image sensor 71a and the second position farthest from the image sensor 71a.

The sleeves 300 and 400 are disposed so that the substantially C-shaped and substantially L-shaped openings face each other. Due to this arrangement, the first fit portion 401 is located between the first fit portion 301 and the second fit portion 302 in the optical axis direction. That is, the first fit portion 401 is sandwiched between the first fit portion 301 and the second fit portion 302. Further, the second fit portion 302 is located between the first fit portion 401 and the second fit portion 402 in the optical axis direction. That is, the second fit portion 302 is sandwiched between the first fit portion 401 and the second fit portion 402.

Due to this structure, the sleeves 300 and 400 can be disposed to overlap each other in the optical axis direction. Therefore, the lengths of the sleeves 300 and 400 in the optical axis direction can be increased without increasing the overall length of the lens barrel 1 in the optical axis direction, and tilts of the moving frames 30 and 40 relative to the optical axis can be reduced. In addition, by inserting the common guide bar 84 into the sleeves 300, 400, tilts of the moving frames 30 and 40 relative to the optical axis can be reduced more effectively than that in a case where each sleeve is supported by a different guide bar.

As illustrated in FIG. 1, the optical filter holding frame 60 holds the infrared cut filter 61 and the dummy glass 62, and is supported movably in the direction orthogonal to the optical axis by the guide bar 86. The guide bar 87 is engaged with the groove in the optical filter holding frame 60 and restrains the optical filter holding frame 60 from rotating around the guide bar 86.

The rack 67 is fixed onto the optical filter holding frame 60 while the rack 67 is biased in a perpendicular direction perpendicular to the optical axis and in a direction orthogonal to the perpendicular direction by an unillustrated biasing spring. A torsion spring can be used as the unillustrated biasing spring. Furthermore, the rack 67 is engaged with a threaded portion 69a of the stepping motor 69. Therefore, the driving force of the stepping motor 69 is transmitted to the rack 67 via the threaded portion 69a, and the optical filter holding frame 60 can be moved in a direction orthogonal to the optical axis. Thereby, the infrared cut filter 61 and the dummy glass 62 can be switched as an optical filter on the optical path.

Figure 5:
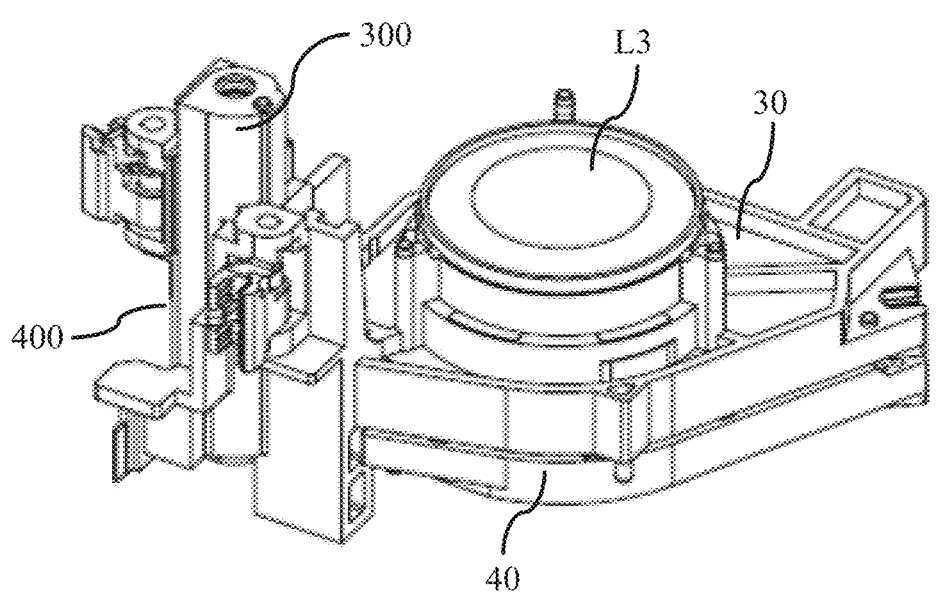
FIG. 5 is a perspective view of an overlap state of the third lens unit moving frame and the fourth lens unit moving frame according to the first embodiment.
Figure 6:
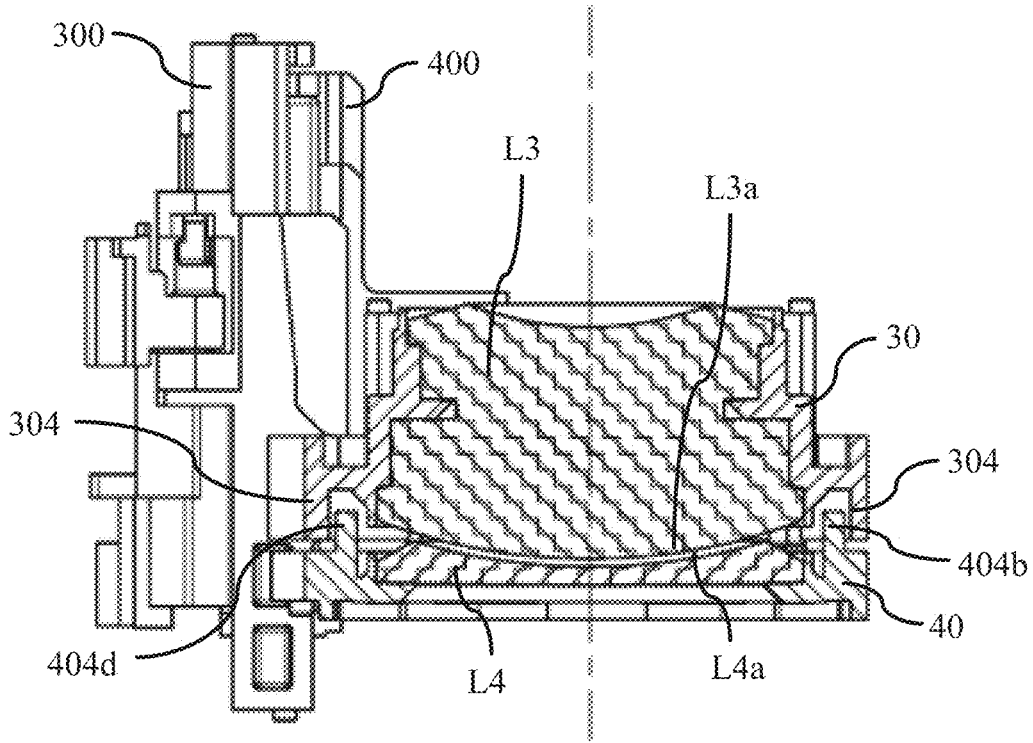
FIG. 6 is a sectional view on an optical axis of the overlap state of the third lens unit moving frame and the fourth lens unit moving frame according to the first embodiment.
Figure 7A:
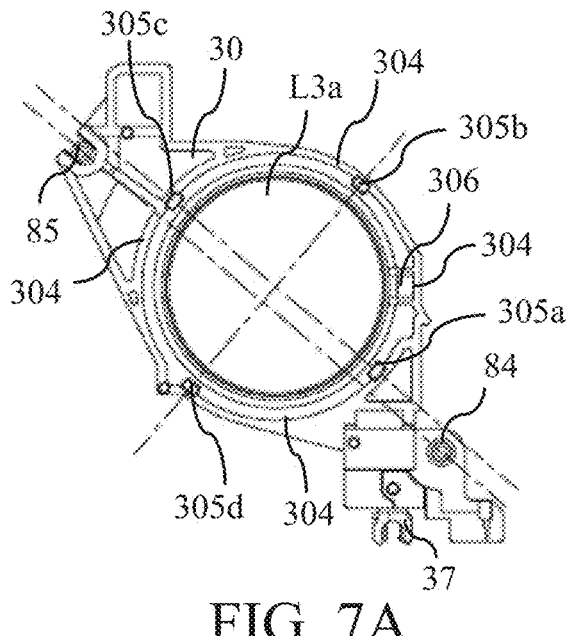
FIGS. 7A and 7B explain a detailed shape of the third lens unit moving frame according to the first embodiment.
Figure 7B:
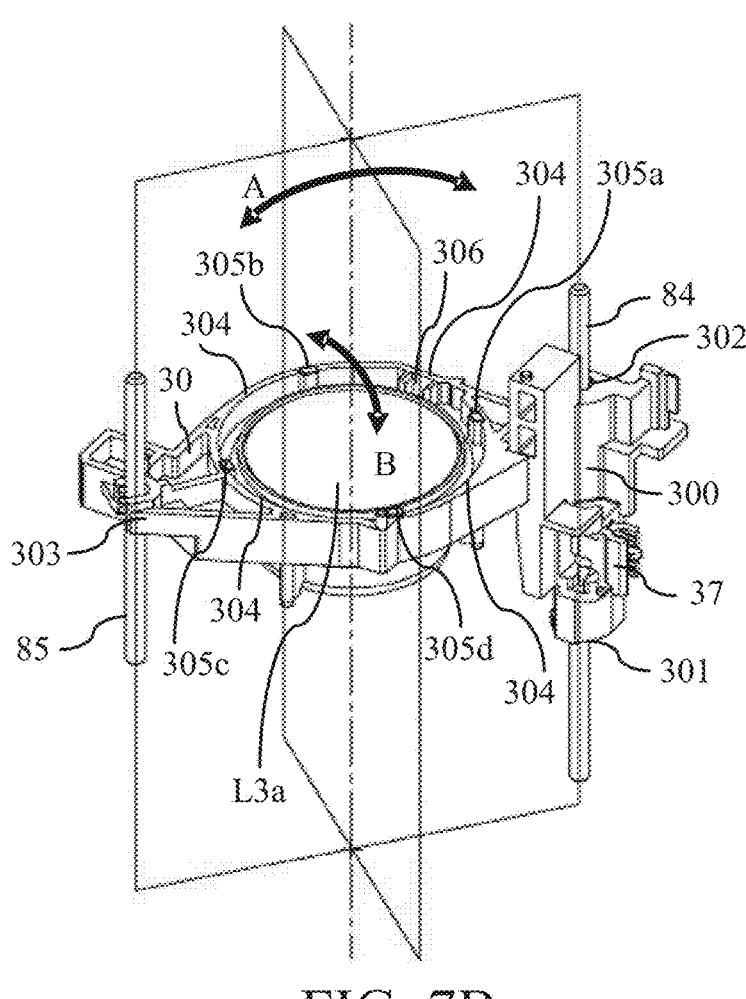
Figure 8A:
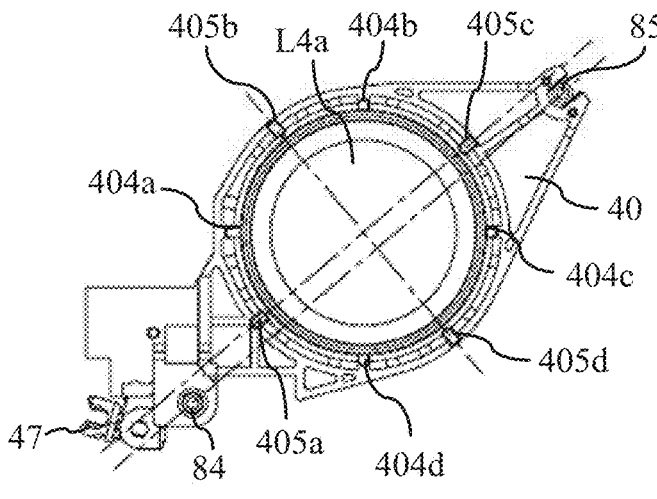
FIGS. 8A and 8B explain a detailed shape of the fourth lens unit moving frame according to the first embodiment.
Figure 8B:
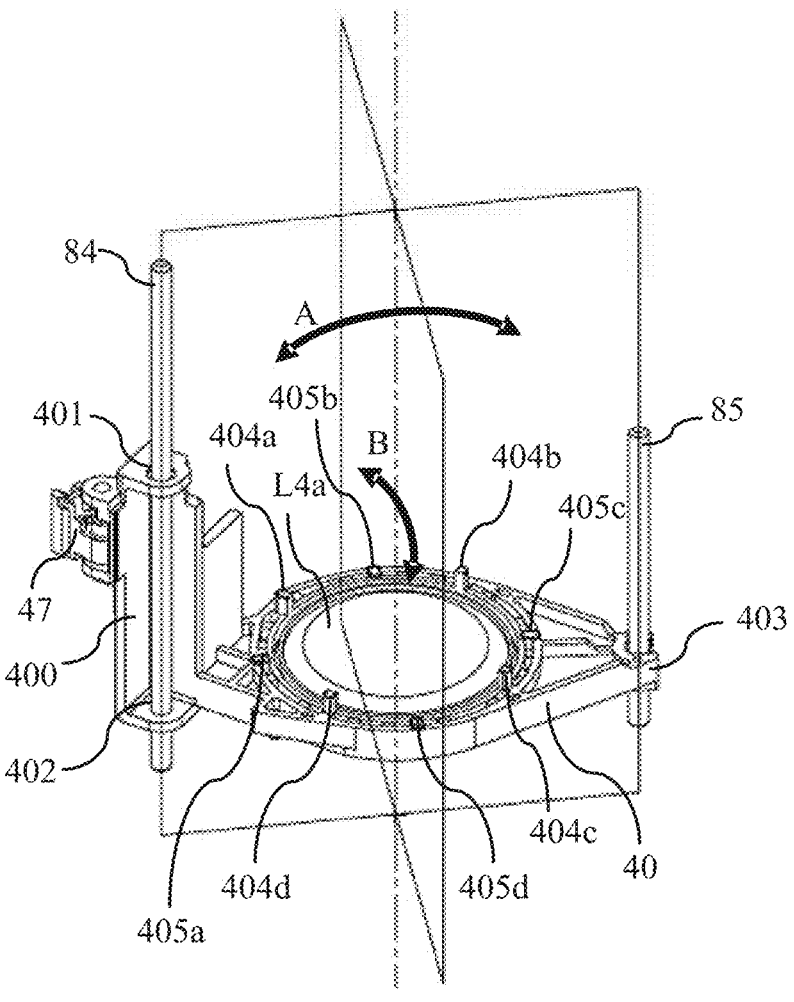
Figure 9:
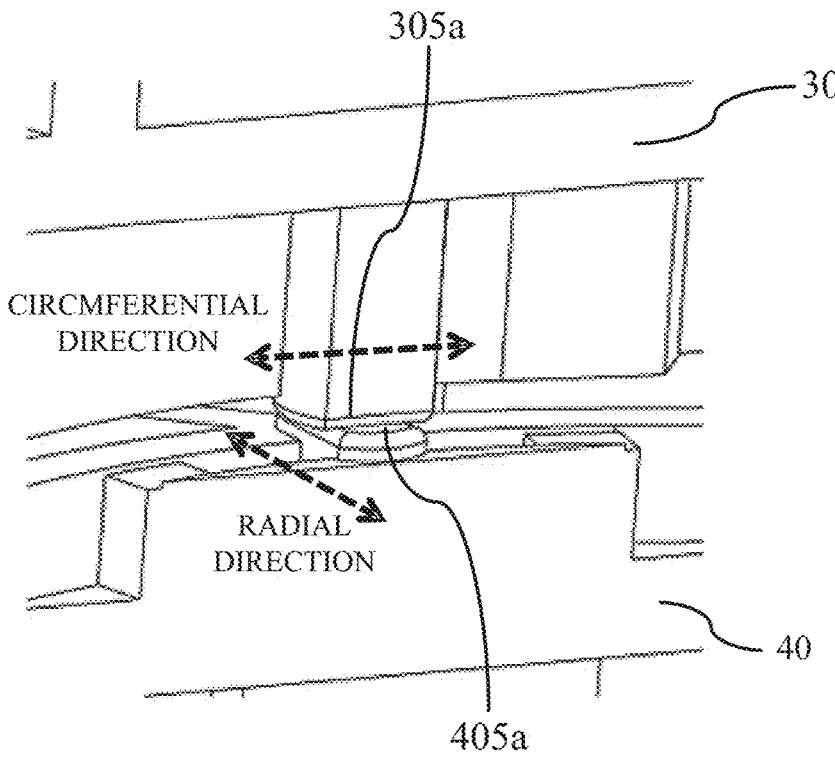
FIG. 9 illustrates how a first (third-lens-unit) contact portion and a first (fourth-lens-unit) contact portion according to the first embodiment come into contact with each other.

A description will now be given of the states of the moving frames 30 and 40 during assembly. FIG. 5 is a perspective view of an overlap state of the moving frames 30 and 40. FIG. 6 is a sectional view along the optical axis of the overlap state of the moving frames 30 and 40. FIGS. 7A and 7B explain the detailed shape of the moving frame 30. FIG. 7A illustrates the moving frame 30 viewed from the moving frame 40 side, and FIG. 7B is a perspective view of the moving frame 30. FIGS. 8A and 8B explain the detailed shape of the moving frame 40. FIG. 8A illustrates the moving frame 40 viewed from the moving frame 30 side, and FIG. 8B is a perspective view of the moving frame 40. FIG. 9 illustrates how a first (third-lens-unit) contact portion

305a of the moving frame 30 and a first (fourth-lens-unit) contact portion 405a of the moving frame 40 come into contact with each other.

During assembly of the lens barrel 1, as illustrated in FIG. 5, the common guide bar 84 is inserted into the sleeves 300 and 400 while the moving frame 30 and the moving frame 40 overlap each other. At this time, as illustrated in FIG. 6, a convex surface L3a, which is the rearmost lens surface of the third lens unit L3, and a concave surface L4a, which is the frontmost lens surface of the fourth lens unit L4, face each other and are close to each other. Therefore, in a case where the relative positions of the moving frames 30 and 40 significantly shift, the convex surface L3a and the concave surface L4a may contact (or collide with) each other and get damaged.

In this embodiment, the rearmost lens surface of the third lens unit L3 is a convex surface, and the frontmost lens surface of the fourth lens unit L4 is a concave surface, but this embodiment is not limited to this example. The rearmost lens surface of the third lens unit L3 may be a concave surface, and the frontmost lens surface of the fourth lens unit L4 may be a convex surface.

In this embodiment, in order to suppress contact between the convex surface L3a and the concave surface L4a, the moving frame 30 has a (third-lens-unit) guide portion (first engagement portion) 304 and a (third-lens-unit) contact portion (first contact portion) 305. The moving frame 40 includes a (fourth-lens-unit) guide portion (second engagement portion) 404 and a (fourth-lens-unit) contact portion (second contact portion) 405. The moving frame 30 further includes a (third-lens-unit) rotation stopper 306.

The guide portion 304 has an annular shape around the optical axis as a center so as to cover the outer circumference of the convex surface L3a. More specifically, the guide portion 304 has a wall shape formed so as to cover the outer circumference of the convex surface L3a. The annular shape includes not only a strictly annular shape but also a substantially annular shape (approximately annular shape). The guide portion 404 includes a first (fourth-lens-unit) guide portion 404a, a second (fourth-lens-unit) guide portion 404b, and a third (fourth-lens-unit) guide portion 404c, and a fourth (fourth-lens-unit) guide portion 404d, which are arranged along the circumferential direction around the optical axis as a center of the outer circumference of the concave surface L4a. More specifically, each of the guide portions has a convex shape. The circumferential direction includes not only a strictly circumferential direction but also a substantially circumferential direction (approximately circumferential direction). In this embodiment, the guide portion 304 has an annular shape, but it may be disposed along the circumferential direction around the optical axis as a center.

The contact portion 305 has an approximately oval shape extending in the circumferential direction, and includes the first (third-lens-unit) contact portion 305a, a second (third-lens-unit) contact portion 305b, a third (third-lens-unit) contact portion 305c, and a fourth (third-lens-unit) contact portion 305d. The first contact portion 305a and the third contact portion 305c are located on a line segment that passes near the optical axis and is approximately parallel to a line segment connecting the center axes of the common guide bars 84 and 85 and orthogonal to the center axes, and the first contact portion 305a and the third contact portion 305c are located on both sides of the convex surface L3a symmetrically about the optical axis as a center (symmetrically with respect to the optical axis). The second contact portion 305b and the fourth contact portion 305d are located on a line segment that passes near the optical axis and is approximately orthogonal to the line segment connecting the center axes of the common guide bars 84 and 85 and orthogonal to the center axes, and the second contact portion 305*b* and the fourth contact portion 305*d* are located on both sides of the convex surface L3*a* symmetrically about the optical axis as a center (symmetrically with respect to the optical axis).

The contact portion 405 has an approximately oval shape extending in the radial direction, and includes the first (fourth-lens-unit) contact portion 405*a*, a second (fourth-lens-unit) contact portion 405*b*, a third (fourth-lens-unit) contact portion 405*c*, and a (fourth-lens-unit) contact portion 405*d*. The first contact portion 405*a* and the third contact portion 405*c* are located on a line segment that passes near the optical axis and is approximately parallel to a line segment connecting the center axes of the common guide bars 84 and 85 and orthogonal to the center axes, and are located on both sides of the concave surface L4*a* symmetrically about the optical axis as a center (symmetrically with respect to the optical axis). The second contact portion 405*b* and the fourth contact portion 405*d* are located on a line segment that passes near the optical axis and is approximately orthogonal to a line segment connecting the center axes of the common guide bars 84 and 85 and orthogonal to the center axes, and are located on both sides of the concave surface L4*a* symmetrically about the optical axis as a center (symmetrically with respect to the optical axis).

The guide portions 304 and 404 are engaged with each other with play (a predetermined gap between them) in the direction orthogonal to the optical axis direction, as illustrated in FIG. 6, while the moving frames 30 and 40 overlap each other. Thereby, the relative positions of the moving frames 30 and 40 in a plane orthogonal to the optical axis can be restricted. In addition, in the assembly state of the lens barrel 1, the moving frames 30 and 40 can be moved in the optical axis direction along the common guide bars 84 and 85 without interference between the guide portions 304 and 404.

The rotation stopper 306 and the first guide portion 404*a* are engaged with each other with play while the moving frames 30 and 40 overlap each other. Thereby, the relative rotations of the moving frame 30 and 40 around the optical axis can be restricted. In addition, in the assembly state of the lens barrel 1, the moving frames 30 and 40 can be moved in the optical axis direction along the common guide bars 84 and 85 without interference between the rotation stopper 306 and the first guide portion 404*a*.

While the moving frames 30 and 40 overlap each other, the contact portions 305*a* to 305*d* contact the contact portions 405*a* to 405*d*, respectively, within a range of the above play. For example, as illustrated in FIG. 9, the first contact portion 305*a* has a width larger than the above play in the circumferential direction, and the first contact portion 405*a* has a width larger than the above play in the radial direction. Therefore, within the range of the above play, the first contact portion 305*a* and the first contact portion 405*a* can always contact each other. Due to this structure, the relative positions of the moving frames 30 and 40 in the optical axis direction can be restricted.

Due to the above structure, during assembly of the lens barrel 1, the relative positions of the moving frames 30 and 40 can be restricted while the moving frames 30 and 40 overlap each other. As a result, contact between the convex surface L3*a* and the concave surface L4*a* can be suppressed.

As described above, the sleeves 300 and 400 are supported by the common guide bar 84, and the grooves 303 and

403 are supported by the common guide bar 85. Therefore, in a case where an impact is applied to the lens barrel 1, each of the moving frames 30 and 40 tends to be bent in an arrow A direction in a plane containing the central axes of the common guide bars 84 and 85, respectively, as illustrated in FIGS. 7B and 8B.

In this embodiment, as described above, the first contact portion 305*a* and the contact portion 305*c* are located on a line segment that passes near the optical axis and is approximately parallel to a line segment connecting the center axes of the common guide bars 84 and 85 and orthogonal to the center axes, and the first contact portion 305*a* and the contact portion 305*c* are located on both sides of the convex surface L3*a* symmetrically about the optical axis as a center (symmetrically with respect to the optical axis). The first contact portion 405*a* and the third contact portion 405*c* are located on a line segment that passes near the optical axis and is approximately parallel to a line segment connecting the center axes of the common guide bars 84 and 85 and orthogonal to the center axes, and are located on both sides of the concave surface L4*a* symmetrically about the optical axis as a center (symmetrically with respect to the optical axis). Therefore, while the moving frames 30 and 40 are bent in the arrow A direction, the first contact portions 305*a* and 405*a* or the third contact portions 305*c* and 405*c* contact each other. As a result, contact between the convex surface L3*a* and the concave surface L4*a* can be suppressed.

The first contact portion 305*a* and the third contact portion 305*c* have shapes extending in the circumferential direction, and the first contact portion 405*a* and the third contact portion 405*c* have shapes extending in the radial direction. Therefore, even if the bending amounts of the moving frames 30 and 40 are large and the contact positions of the corresponding contact portions shift from their original positions by the bending amounts, the above contact portions can reliably contact each other.

In this embodiment, as described above, the second contact portion 305*b* and the fourth contact portion 305*d* are located on a line segment that passes near the optical axis and is approximately orthogonal to the line segment connecting the center axes of the common guide bars 84 and 85 and orthogonal to the center axes, and the second contact portion 305*b* and the fourth contact portion 305*d* are located on both sides of the convex surface L3*a* symmetrically about the optical axis as a center (symmetrically with respect to the optical axis). The second contact portion 405*b* and the fourth contact portion 405*d* are located on a line segment that passes near the optical axis and is approximately orthogonal to the line segment connecting the center axes of the common guide bars 84 and 85 and orthogonal to the center axes, and are located on both sides of the concave surface L4*a* symmetrically about the optical axis as a center (symmetrically with respect to the optical axis). Therefore, in a case where a relative tilt occurs between the moving frames 30 and 40 in an arrow B direction orthogonal to the arrow A direction, the second contact portions 305*b* and 405*b* or the fourth contact portions 305*d* and 405*d* contact each other. As a result, the relative tilts of the moving frames 30 and 40 in the arrow B direction are restricted, and contact between the convex surface L3*a* and the concave surface L4*a* can be suppressed.

The second contact portion 305*b* and the fourth contact portion 305*d* have shapes extending in the circumferential direction, and the second contact portion 405*b* and the fourth contact portion 405*d* have shapes extending in the radial direction. Therefore, even if the bending amounts of the moving frames 30 and 40 are large and the contact positions of the corresponding contact portions shift from their original positions by the bending amounts, the above contact portions can reliably contact each other.

Due to the arrangements and shapes of the above contact portions, contact between adjacent lens surfaces can be suppressed even when an impact is applied to the lens barrel 1 or during assembly of the lens barrel 1.

Second Embodiment

The lens barrel 11 according to this embodiment basically has a structure similar to that of the lens barrel 1 according to the first embodiment, but this embodiment is different from the first embodiment in the shapes of the third lens unit, the (third lens unit) moving frame, the fourth lens unit, and the (fourth lens unit) moving frame. This example will discuss only structures different from those of the first embodiment.

A sleeve and groove of a (third lens unit) moving frame 130 have the same shapes as those of the sleeve 300 and groove 303 of the moving frame 30 according to the first embodiment, and a sleeve and groove of a (fourth lens unit) moving frame 140 according to this embodiment have the same shapes as those of the sleeve 400 and groove 403 of the moving frame 40 according to the first embodiment, and they are designated by the same reference numerals.

Figure 10:
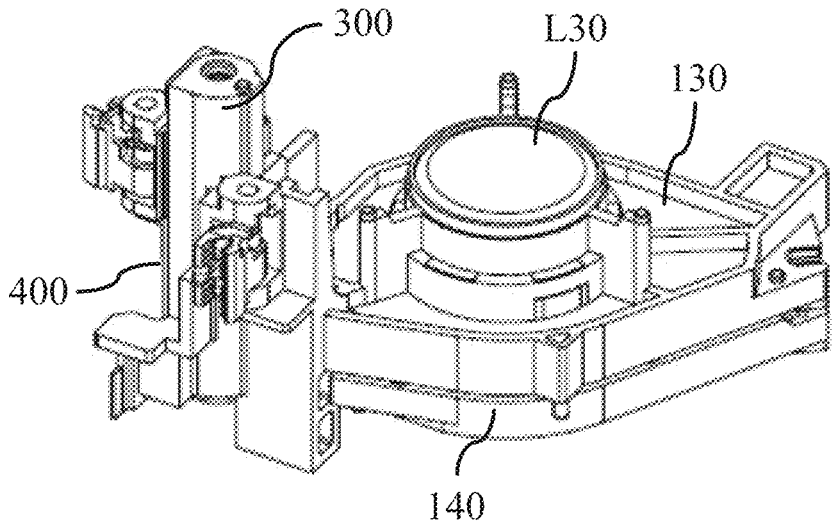
FIG. 10 is a perspective view of an overlap state of a third lens unit moving frame and a fourth lens unit moving frame according to a second embodiment.
Figure 11:
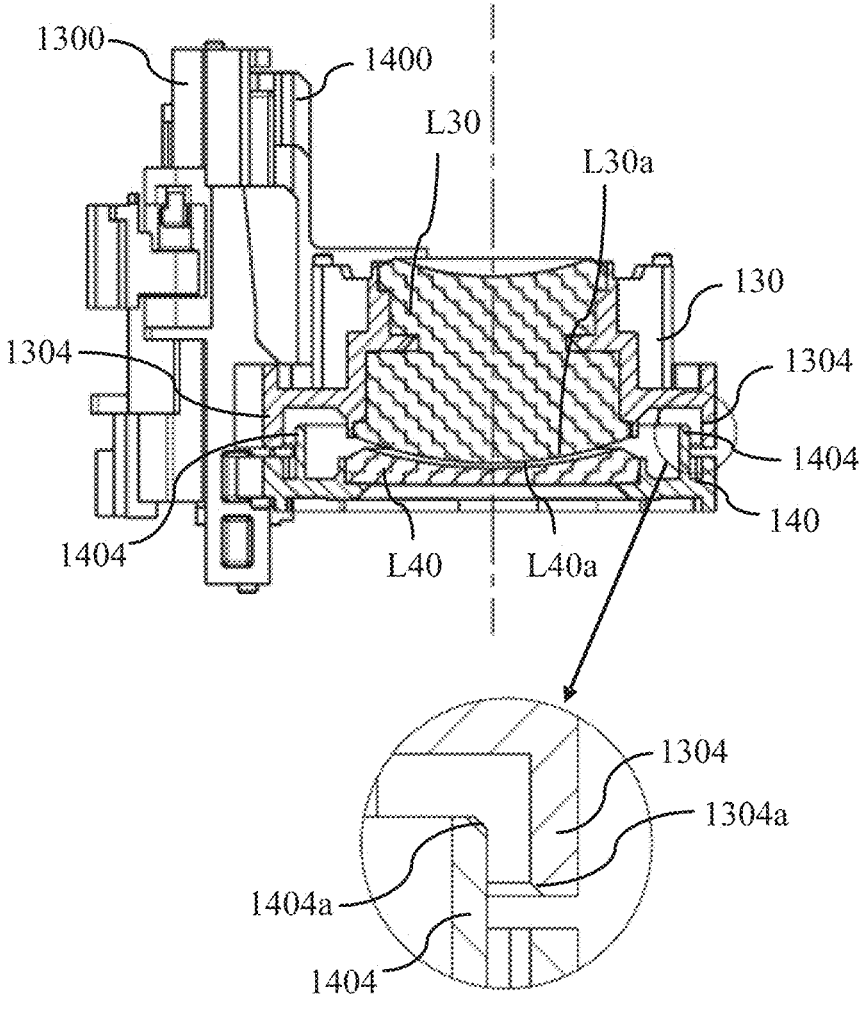
FIG. 11 is a sectional view along the optical axis of the overlap state of the third lens unit moving frame and the fourth lens unit moving frame according to a second embodiment.
Figure 12A:
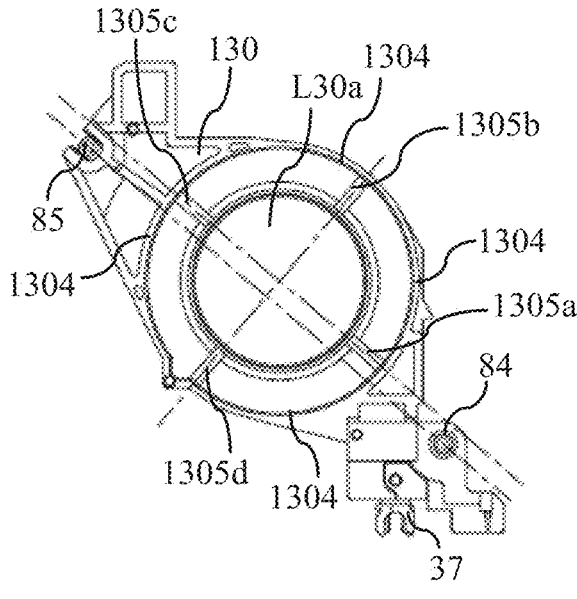
FIGS. 12A and 12B explain a detailed shape of the third lens unit moving frame according to the second embodiment.
Figure 12B:
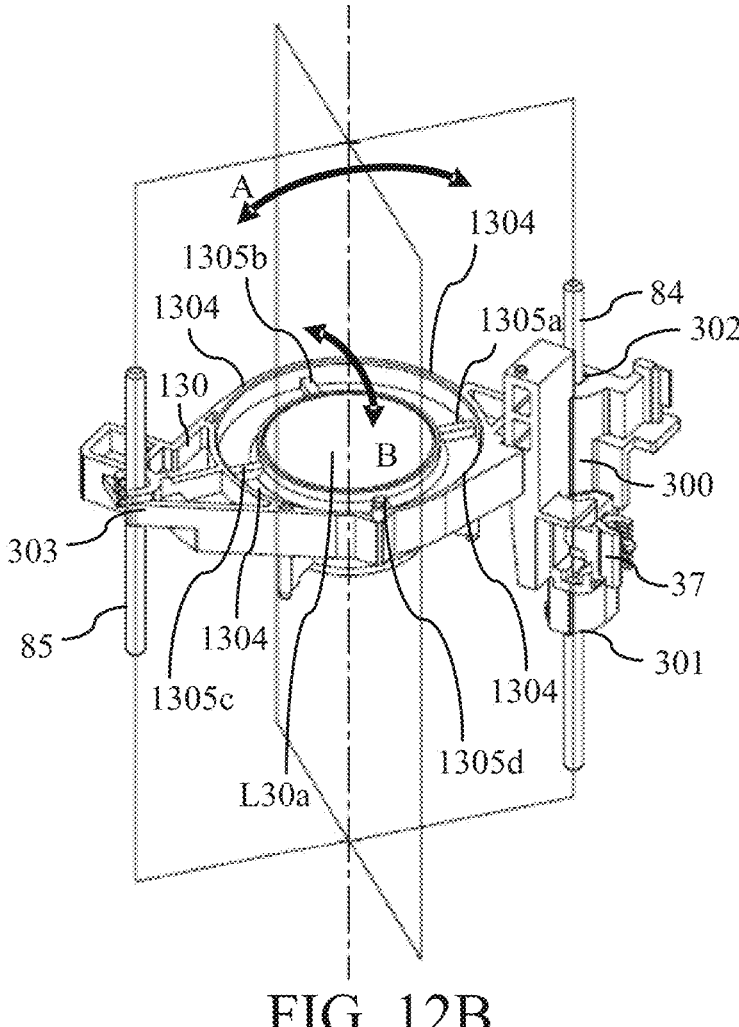
Figure 13A:
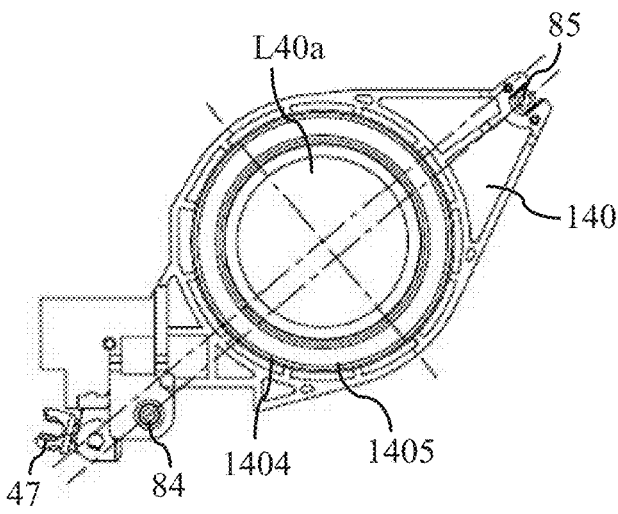
FIGS. 13A and 13B explain a detailed shape of the fourth lens unit moving frame according to the second embodiment.
Figure 13B:
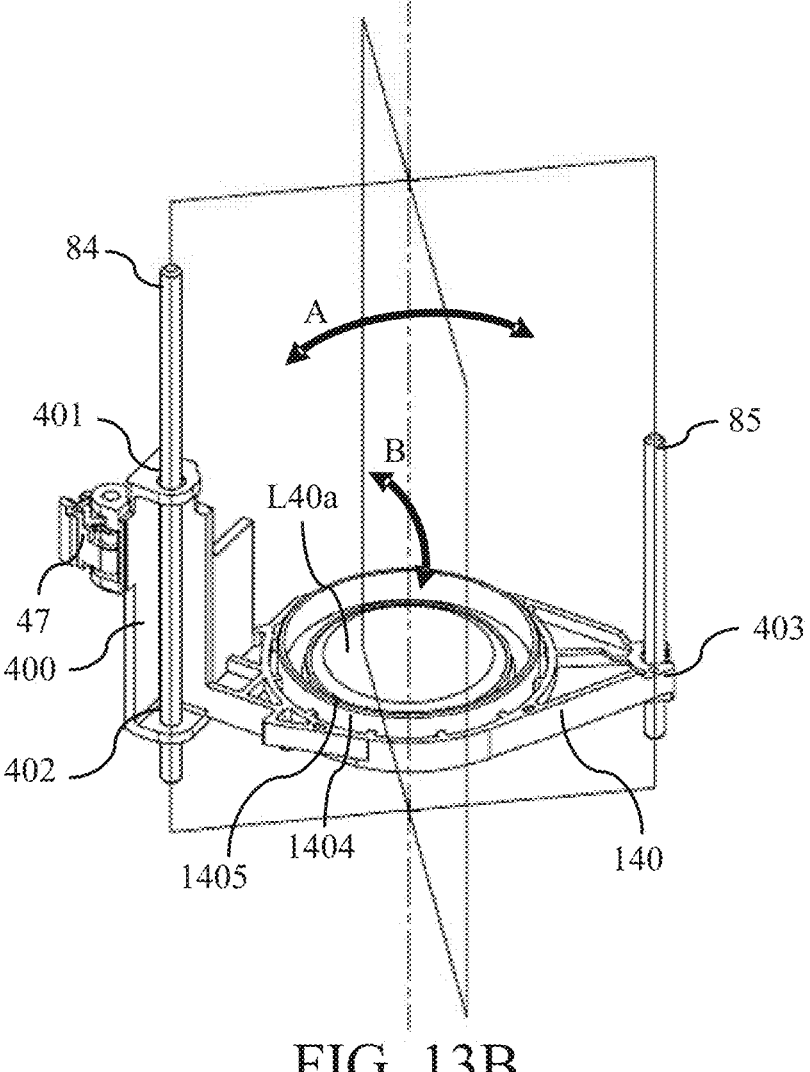
Figure 14:
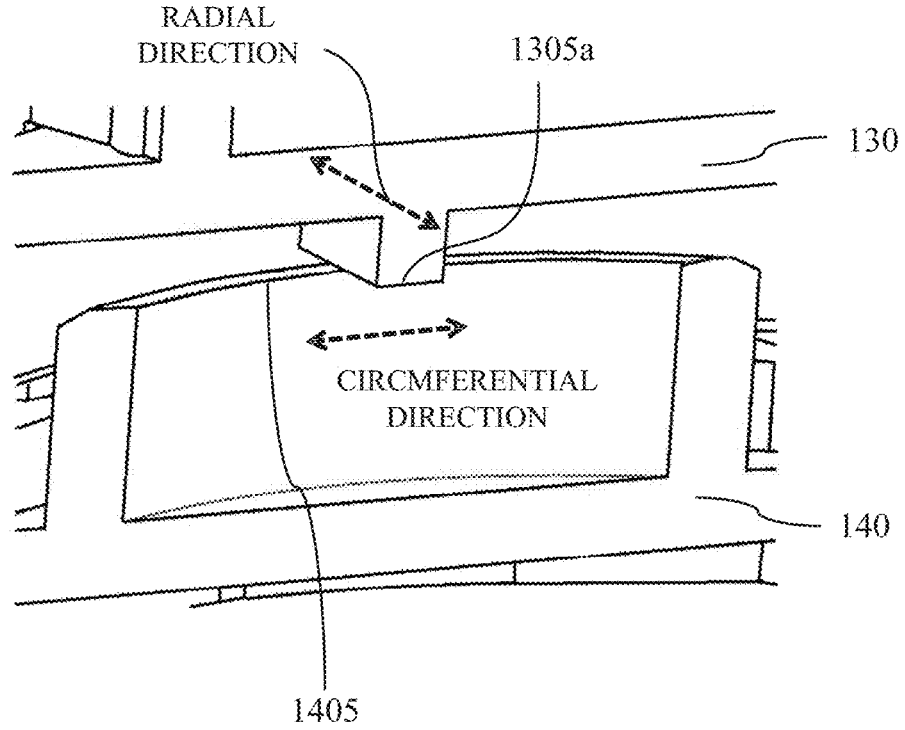
FIG. 14 illustrates how a first (third-lens-unit) contact portion and a (fourth-lens-unit) contact portion according to the second embodiment come into contact with each other.

A description will now be given of the states of the moving frames 130 and 140 during assembly. FIG. 10 is a perspective view of an overlap state of the moving frames 130 and 140. FIG. 11 is a sectional view along the optical axis of the overlap state of the moving frames 130 and 140. FIGS. 12A and 12B explain the detailed shape of the moving frame 130. FIG. 12A illustrates the moving frame 130 viewed from the moving frame 140 side, and FIG. 12B is a perspective view of the moving frame 130. FIGS. 13A and 13B explain the detailed shape of the moving frame 140. FIG. 13A illustrates the moving frame 140 viewed from the moving frame 130 side, and FIG. 13B is a perspective view of the moving frame 140. FIG. 14 illustrates how a first (third-lens-unit) contact portion 1305a of the moving frame 130 and a (fourth-lens-unit) contact portion 1405 of the moving frame 140 come into contact with each other.

During assembly of the lens barrel 11, as illustrated in FIG. 10, the common guide bar 84 is inserted into the sleeves 300 and 400 while the moving frame 130 and the moving frame 140 overlap each other. At this time, as illustrated in FIG. 11, a convex surface L30a, which is the rearmost lens surface of the third lens unit L30, and a concave surface L40a, which is the frontmost lens surface of the fourth lens unit L40, face each other and are close to each other. Therefore, in a case where the relative positions of the moving frames 130 and 140 significantly shift, the convex surface L30a and the concave surface L40a may contact (or collide with) each other and get damaged.

In this embodiment, the rearmost lens surface of the third lens unit L30 is a convex surface, and the frontmost lens surface of the fourth lens unit L40 is a concave surface, but this embodiment is not limited to this example. The rearmost lens surface of the third lens unit L30 may be a concave surface, and the frontmost lens surface of the fourth lens unit L40 may be a convex surface.

In this embodiment, in order to suppress contact between the convex surface L3a and the concave surface L4a, the moving frame 130 has a (third-lens-unit) guide portion (first engagement portion) 1304 and a (third-lens-unit) contact portion (first contact portion) 1305. The moving frame 140 includes a (fourth-lens-unit) guide portion (second engagement portion) 1404 and a (fourth-lens-unit) contact portion (second contact portion) 1405. In this embodiment, the top surface of the guide portion 1404 functions as a (fourth-lens-unit) contact portion 1405.

The guide portion 1304 has an annular shape around the optical axis as a center so as to cover the outer circumference of the convex surface L30a. More specifically, the guide portion 1304 has a wall shape formed so as to cover the outer circumference of the convex surface L30a. The guide portion 1404 has an annular shape around the optical axis as a center so as to cover the outer circumference of the concave surface L40a. More specifically, the guide portion 1404 has a wall shape formed so as to cover the outer circumference of the concave surface L40a. The annular shape includes not only a strictly annular shape but also a substantially annular shape (approximately annular shape).

The contact portion 1305 includes a first (third-lens-unit) contact portion 1305a, a second (third-lens-unit) contact portion 1305b, a third (third-lens-unit) contact portion 1305c, and a fourth (third-lens-unit) contact portion 1305c, each having a rib shape extending in the radial direction. The first contact portion 1305a and the contact portion 1305c are located on a line segment that passes near the optical axis and is approximately parallel to a line segment connecting the center axes of the common guide bars 84 and 85 and orthogonal to the center axes, and the first contact portion 1305a and the contact portion 1305c are located on both sides of the convex surface L30a symmetrically about the optical axis as a center (symmetrically with respect to the optical axis). The second contact portion 1305b and the fourth contact portion 1305d are located on a line segment that passes near the optical axis and is approximately orthogonal to the line segment connecting the center axes of the common guide bars 84 and 85 and orthogonal to the center axes, and the second contact portion 1305b and the fourth contact portion 1305d are located on both sides of the convex surface L30a symmetrically about the optical axis as a center (symmetrically with respect to the optical axis).

The contact portion 1405 is the top surface of the guide portion 1404, and has an approximately annular shape around the optical axis as a center.

The guide portions 1304 and 1404 are engaged with each other with play (a predetermined gap between them), as illustrated in FIG. 11, while the moving frames 130 and 140 overlap each other. Thereby, the relative positions of the moving frames 130 and 140 in a plane orthogonal to the optical axis can be restricted. In addition, in the assembly state of the lens barrel 1, the moving frames 130 and 140 can be moved in the optical axis direction along the common guide bars 84 and 85 without interference between the guide portions 1304 and 1404. As illustrated in FIG. 11, chamfered portions 1304a and 1404a are formed on the portions of the guide portions 1304 and 1404 that face each other in a case where the guide portions 1304 and 1404 are engaged with each other. Thereby, the guide portions 1304 and 1404 can be easily engaged with each other in a case where the moving frames 130 and 140 overlap each other.

While the moving frames 130 and 140 overlap each other, the first to fourth contact portions 1305a to 1305d contact the contact portion he contact portion 1405 within a range of the above play. For example, as illustrated in FIG. 14, the first contact portion 1305a has a width larger than the above play in the radial direction, and the contact portion 1405a has an approximately annular shape around the optical axis as a center. Therefore, within the range of the above play, the first contact portion 1305a and the contact portion 1405a can always contact each other. Thereby, the relative positions of the moving frames 130 and 140 in the optical axis direction can be restricted.

Due to the above structure, during assembly of the lens barrel 1, the relative positions of the moving frames 130 and 140 can be restricted while the moving frames 130 and 140 overlap each other. As a result, contact between the convex surface L30*a* and the concave surface L40*a* can be suppressed.

As described above, the sleeves 300 and 400 are supported by the common guide bar 84, and the grooves 303 and 403 are supported by the common guide bar 85. Therefore, in a case where an impact is applied to the lens barrel 1, each of the moving frames 130 and 140 tends to be bent in an arrow A direction in a plane containing the central axes of the common guide bars 84 and 85, respectively, as illustrated in FIGS. 12B and 13B.

In this embodiment, as described above, the first contact portion 1305 and the third contact portion 1305*c* are located on a line segment that passes near the optical axis and is approximately parallel to a line segment connecting the center axes of the common guide bars 84 and 85 and orthogonal to the center axes, and the first contact portion 1305 and the third contact portion 1305*c* are located on both sides of the convex surface L30*a* symmetrically about the optical axis as a center. Further, the contact portion 1405 has an approximately annular shape around the optical axis as a center. Therefore, while the moving frames 130 and 140 are bent in the arrow A direction, the first contact portion 1305*a* and the contact portion 1405, or the third contact portion 1305*c* and the contact portion 1405 contact each other. As a result, contact between the convex surface L30*a* and the concave surface L40*a* can be suppressed.

The first contact portion 1305*a* and the contact portion 1305*c* have shapes extending in the radial direction, and the contact portion 1405 has an approximately annular shape around the optical axis as a center. Therefore, even if the bending amounts of the moving frames 130 and 140 are large and the contact positions of the corresponding contact portions shift from their original positions by the bending amounts, the above contact portions can reliably contact each other.

In this embodiment, as described above, the second contact portion 1305*b* and the fourth contact portion 1305*d* are located on a line segment that passes near the optical axis and is approximately orthogonal to the line segment connecting the center axes of the common guide bars 84 and 85 and orthogonal to the center axes, and the second contact portion 1305*b* and the fourth contact portion 1305*d* are located on both sides of the convex surface L30*a* symmetrically about the optical axis as a center (symmetrically with respect to the optical axis). The contact portion 1405 has an approximately annular shape around the optical axis as a center. Therefore, in a case where a relative tilt occurs between the moving frames 130 and 140 in an arrow B direction orthogonal to the arrow A direction, the second contact portion 1305*b* and the contact portion 1405 or the fourth contact portion 1305*d* and the contact portion 1405 contact each other. As a result, the relative tilts of the moving frames 130 and 140 in the arrow B direction is restricted, and contact between the convex surface L30*a* and the concave surface L40*a* can be suppressed.

The second contact portion 1305*b* and the fourth contact portion 1305*d* have shapes extending in the radial direction, and the contact portion 1405 has a substantially annular shape around the optical axis as a center. Therefore, even if the bending amounts of the moving frames 130 and 140 are large and the contact positions of the corresponding contact portions shift from their original positions by the bending amounts, the above contact portions can reliably contact each other.

Due to the arrangements and shapes of the above contact portions, contact between adjacent lens surfaces can be suppressed even when an impact is applied to the lens barrel 11 or during assembly of the lens barrel 11.

In this embodiment, the curvature of the convex surface L30*a* is larger than the curvature of the concave surface L40*a*. In comparison with a case where the curvature of the convex surface L30*a* is smaller than the curvature of the concave surface L40*a*, a distance between the third lens unit L30 and the fourth lens unit L40 can be further reduced, and the overall length of the lens barrel 11 in the optical axis direction can be reduced.

Due to the above structure, in a lens barrel in which the fit portions of the sleeves of the two lens frames are alternated relative to a single guide bar, the impact resistance can be improved while assembly efficiency and yield are improved without increasing the size.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide a lens barrel that can improve impact resistance while improving assembly efficiency and yield.

This application claims priority to Japanese Patent Application No. 2023-107105, which was filed on Jun. 29, 2023, and which is hereby incorporated by reference herein in its entirety.

What is claimed is:

1. A lens barrel comprising:

a first holder configured to hold a first lens;

a second holder configured to hold a second lens disposed adjacent to the first lens in an optical axis direction;

a first guide bar configured to support the first holder and the second holder movably in the optical axis direction; and a second guide bar configured to restrain the first holder and the second holder from rotating around the first guide bar, wherein the first holder includes two first fit portions in which the first guide bar is fit at positions separated in the optical axis direction, and a first groove engaged with the second guide bar, wherein the second holder includes two second fit portions in which the first guide bar is fit at positions separated in the optical axis direction, and a second groove engaged with the second guide bar, wherein one of the first fit portions is located between the second fit portions in the optical axis direction, wherein one of the second fit portions is located between the first fit portions in the optical axis direction, wherein the first holder includes a first engagement portion and a first contact portion, wherein the second holder includes a second engagement portion and a second contact portion, wherein the first engagement portion and the second engagement portion are engaged with each other with a gap formed in a direction orthogonal to the optical axis direction, and wherein the first contact portion and the second contact portion contact each other in the optical axis direction so that the first lens and the second lens do not contact each other while the first engagement portion and the second engagement portion of the second holder are engaged with each other.

2. The lens barrel according to claim 1, wherein the first engagement portion and the second engagement portion are arranged along a circumferential direction around an optical axis as a center, or in an annular shape around the optical axis as the center.

3. The lens barrel according to claim 1, wherein the first engagement portion has a wall shape formed to cover an outer circumference of the first lens, and wherein the second engagement portion has at least one convex shape, or a wall shape formed to cover an outer circumference of the second lens.

4. The lens barrel according to claim 1, wherein the first engagement portion and the second engagement portion have chamfered portions that face each other while the first engagement portion and the second engagement portion are engaged with each other.

5. The lens barrel according to claim 1, wherein the first contact portion has a shape extending in a radial direction, and wherein the second contact portion has a shape extending in a circumferential direction.

6. The lens barrel according to claim 1, wherein the first holder includes at least two first contact portions, and the first contact portions are located on a line segment that passes near an optical axis and is approximately parallel to a line segment connecting center axes of the first guide bar and the second guide bar and orthogonal to the center axes, and are located symmetrically with respect to the optical axis, and wherein the second holder includes at least two second contact portions, and the second contact portions are located on a line segment that passes near the optical axis and is approximately parallel to the line segment connecting the center axes of the first guide bar and the second guide bar and orthogonal to the center axes, and are located symmetrically with respect to the optical axis.

7. The lens barrel according to claim 1, wherein the first holder includes at least two first contact portions, and the first contact portions are located on a line segment that passes near an optical axis and is approximately orthogonal to a line segment connecting center axes of the first guide bar and the second guide bar and orthogonal to the center axes, and are located symmetrically with respect to the optical axis, and wherein the second holder includes at least two second contact portions that are located on a line segment that passes near the optical axis and is approximately orthogonal to the line segment connecting the center axes of the first guide bar and the second guide bar and orthogonal to the center axes, and are located symmetrically with respect to the optical axis.

8. The lens barrel according to claim 1, wherein one of lens surfaces of the first lens and the second lens that face each other has a convex surface, and the other of the lens surfaces has a concave surface.

9. The lens barrel according to claim 1, wherein the convex surface has a curvature larger than that of the concave surface.

\* \* \* \* \*